US009729644B1

(12) United States Patent
Cronin et al.

(10) Patent No.: US 9,729,644 B1
(45) Date of Patent: Aug. 8, 2017

(54) EVENT AND FANTASY LEAGUE DATA TRANSMISSION TO EVENTGOER DEVICES

(71) Applicant: ProSports Technologies, LLC, Miami, FL (US)

(72) Inventors: John Cronin, Bonita Springs, FL (US); Joseph G. Bodkin, Fort Myers, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,296

(22) Filed: Jul. 13, 2015

Related U.S. Application Data

(60) Provisional application No. 62/029,655, filed on Jul. 28, 2014.

(51) Int. Cl.
G06F 15/16 (2006.01)
H04L 29/08 (2006.01)
H04W 4/00 (2009.01)

(52) U.S. Cl.
CPC .............. H04L 67/18 (2013.01); H04L 67/26 (2013.01); H04W 4/003 (2013.01)

(58) Field of Classification Search
None
See application file for complete search history.

(56) References Cited

U.S. PATENT DOCUMENTS

| 6,080,063 | A | 6/2000 | Khosla |
| 6,144,375 | A | 11/2000 | Jain et al. |
| 6,204,813 | B1 | 3/2001 | Wadell et al. |
| 6,952,558 | B2 | 10/2005 | Hardacker |
| 7,079,176 | B1 | 7/2006 | Freeman et al. |

(Continued)

FOREIGN PATENT DOCUMENTS

| CN | 102843186 | 12/2012 |
| EP | 2 150 057 | 12/2013 |

(Continued)

OTHER PUBLICATIONS

"Anvato Announces New Cloud Solution for HD Live Streaming, Clip Editing, Social Sharing and Archival", Anvato Knows/Video, May 12, 2014.

(Continued)

Primary Examiner — Esther B Henderson
(74) Attorney, Agent, or Firm — Polsinelli LLP

(57) ABSTRACT

An event venue with a performance area (e.g., a stage, a sport field) and an eventgoer area (e.g., a stadium seating section) may include beacons and cameras throughout the performance area. The beacons and cameras may each record event occurrence data (e.g., audiovisual data) of particular occurrences (e.g., sport goals, songs played) during an event (e.g., sports game, concert) at the event venue. Other data, such as sports injury data and sports player replacement data, may also be gathered before or during the event. The beacons and cameras may send the event occurrence data and the other data to a transmission system. The transmission system may convert the event occurrence data to a transmittable format and may then output it through one or more local wireless transmitters. Eventgoers mobile devices in the transmission zones of these transmitters may then receive the data.

20 Claims, 9 Drawing Sheets

(56) References Cited

U.S. PATENT DOCUMENTS

| | | |
|---|---|---|
| 7,091,863 B2 | 8/2006 | Ravet |
| 7,136,042 B2 | 11/2006 | Magendanz et al. |
| 7,383,229 B2 | 6/2008 | Jacoby |
| 7,583,901 B2 | 9/2009 | Nakagawa et al. |
| 7,620,426 B2 | 11/2009 | Ortiz et al. |
| 7,715,723 B2 | 5/2010 | Kagawa et al. |
| 7,721,339 B2 | 5/2010 | Madison et al. |
| 7,734,730 B2 | 6/2010 | McCanne |
| 7,743,070 B1 | 6/2010 | Blumberg |
| 7,849,160 B2 | 12/2010 | Hayward |
| 7,884,855 B2 | 2/2011 | Ortiz |
| 8,019,227 B2 | 9/2011 | Iizuka |
| 8,042,140 B2 | 10/2011 | Thomas et al. |
| 8,091,111 B2 | 1/2012 | Logan et al. |
| 8,237,787 B2 | 8/2012 | Hollinger |
| 8,279,051 B2 | 10/2012 | Khan |
| 8,333,321 B2 | 12/2012 | Gressel et al. |
| 8,391,773 B2 | 3/2013 | Arseneau et al. |
| 8,408,553 B2 | 4/2013 | Eskildsen |
| 8,482,612 B2 | 7/2013 | Tamir et al. |
| 8,526,931 B1 | 9/2013 | Fraley |
| 8,538,276 B2 | 9/2013 | Shimada et al. |
| 8,588,432 B1 | 11/2013 | Simon |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,622,832 B2 | 1/2014 | Marty et al. |
| 8,626,465 B2 | 1/2014 | Moore et al. |
| 8,630,216 B2 | 1/2014 | Deivasigamani et al. |
| 8,638,367 B1 | 1/2014 | Allen |
| 8,660,501 B2 | 2/2014 | Sanguinetti |
| 8,706,044 B2 | 4/2014 | Chang et al. |
| 8,724,723 B2 | 5/2014 | Panicker et al. |
| 8,736,681 B2 | 5/2014 | Matsuzawa |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor et al. |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,124,729 B2 | 9/2015 | Jung et al. |
| 9,498,678 B2 | 11/2016 | Cronin |
| 9,571,903 B2 | 2/2017 | Cronin |
| 9,591,336 B2 | 3/2017 | Cronin |
| 9,655,027 B1 | 5/2017 | Cronin |
| 2002/0132612 A1 | 9/2002 | Ishii |
| 2002/0156835 A1 | 10/2002 | Williams et al. |
| 2003/0023595 A1 | 1/2003 | Carbom et al. |
| 2004/0071209 A1 | 4/2004 | Burg et al. |
| 2004/0086257 A1 | 5/2004 | Werberig et al. |
| 2004/0171381 A1* | 9/2004 | Inselberg ............... H04H 20/38 455/426.2 |
| 2005/0012023 A1 | 1/2005 | Vock et al. |
| 2005/0027608 A1 | 2/2005 | Wiesmuller et al. |
| 2005/0093976 A1 | 5/2005 | Valleriano et al. |
| 2005/0202905 A1 | 9/2005 | Chesser |
| 2005/0259618 A1 | 11/2005 | Ahya et al. |
| 2005/0273830 A1 | 12/2005 | Silver et al. |
| 2006/0067654 A1 | 3/2006 | Herberger et al. |
| 2007/0188611 A1 | 8/2007 | Carter |
| 2007/0188612 A1 | 8/2007 | Carter |
| 2007/0200929 A1 | 8/2007 | Conaway |
| 2008/0137507 A1 | 6/2008 | Sun et al. |
| 2008/0140233 A1 | 6/2008 | Seacat |
| 2008/0192116 A1 | 8/2008 | Tamir et al. |
| 2008/0214211 A1 | 9/2008 | Lipovski |
| 2009/0061971 A1 | 3/2009 | Weitzner et al. |
| 2009/0082110 A1 | 3/2009 | Relyea et al. |
| 2009/0171571 A1 | 7/2009 | Son et al. |
| 2010/0026809 A1 | 2/2010 | Curry |
| 2010/0043040 A1 | 2/2010 | Olsen |
| 2010/0123830 A1 | 5/2010 | Vunic |
| 2010/0245588 A1 | 9/2010 | Waehner et al. |
| 2010/0306064 A1 | 12/2010 | Inselburg |
| 2011/0014974 A1* | 1/2011 | Torf ................. G07F 17/3223 463/25 |
| 2011/0050904 A1 | 3/2011 | Anderson |
| 2011/0125809 A1 | 5/2011 | Woods et al. |
| 2011/0165946 A1 | 7/2011 | Pavlich et al. |
| 2011/0202945 A1 | 8/2011 | Pickelsimer et al. |
| 2011/0280540 A1 | 11/2011 | Woodman |
| 2011/0304737 A1 | 12/2011 | Evans et al. |
| 2012/0052949 A1 | 3/2012 | Weitzner et al. |
| 2012/0054178 A1 | 3/2012 | Tran et al. |
| 2012/0188345 A1 | 7/2012 | Salow |
| 2012/0229338 A2 | 9/2012 | Eidloth et al. |
| 2012/0296826 A1 | 11/2012 | Bergdale et al. |
| 2012/0317302 A1 | 12/2012 | Silvestri et al. |
| 2013/0126713 A1 | 5/2013 | Haas et al. |
| 2013/0141555 A1 | 6/2013 | Ganick et al. |
| 2013/0160051 A1 | 6/2013 | Armstrong et al. |
| 2013/0182117 A1 | 7/2013 | Arseneau et al. |
| 2013/0196788 A1 | 8/2013 | Shimizu et al. |
| 2013/0205341 A1 | 8/2013 | Jabara et al. |
| 2013/0208184 A1 | 8/2013 | Castor et al. |
| 2013/0268620 A1 | 10/2013 | Osminer |
| 2013/0279917 A1 | 10/2013 | Son et al. |
| 2013/0283305 A1 | 10/2013 | Hirsch et al. |
| 2013/0286212 A1 | 10/2013 | Sandler et al. |
| 2013/0300821 A1 | 11/2013 | Lankford et al. |
| 2013/0300832 A1 | 11/2013 | Hohteri et al. |
| 2013/0303192 A1 | 11/2013 | Louboutin |
| 2013/0305297 A1 | 11/2013 | Jabara et al. |
| 2013/0317835 A1 | 11/2013 | Mathew |
| 2013/0328771 A1 | 12/2013 | Lin et al. |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335520 A1 | 12/2013 | Campbell et al. |
| 2013/0336662 A1 | 12/2013 | Murayama et al. |
| 2013/0343762 A1 | 12/2013 | Murayama et al. |
| 2014/0031058 A1 | 1/2014 | Zhang et al. |
| 2014/0057658 A1 | 2/2014 | Murad et al. |
| 2014/0062773 A1 | 3/2014 | MacGougan et al. |
| 2014/0063259 A1 | 3/2014 | Rhodes et al. |
| 2014/0065962 A1 | 3/2014 | Le |
| 2014/0071221 A1 | 3/2014 | Dave |
| 2014/0072270 A1 | 3/2014 | Goldberg et al. |
| 2014/0105084 A1 | 4/2014 | Chhabra |
| 2014/0111625 A1 | 4/2014 | Dawe et al. |
| 2014/0139380 A1 | 5/2014 | Ouyang |
| 2014/0141803 A1 | 5/2014 | Marti |
| 2014/0150042 A1 | 5/2014 | Pacor et al. |
| 2014/0161416 A1 | 6/2014 | Chou et al. |
| 2014/0162628 A1 | 6/2014 | Bevelacqua |
| 2014/0164520 A1 | 6/2014 | Fan |
| 2014/0164760 A1 | 6/2014 | Hybertson |
| 2014/0167794 A1 | 6/2014 | Nath |
| 2014/0168170 A1 | 6/2014 | Lazarescu |
| 2014/0171039 A1 | 6/2014 | Bjontegard |
| 2014/0171114 A1 | 6/2014 | Marti |
| 2014/0180820 A1 | 6/2014 | Louboutin |
| 2014/0191979 A1 | 7/2014 | Tsudik |
| 2014/0195675 A1 | 7/2014 | Silver et al. |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |

(56) References Cited

U.S. PATENT DOCUMENTS

| | | |
|---|---|---|
| 2014/0293959 A1 | 10/2014 | Singh |
| 2014/0349750 A1 | 11/2014 | Thompson et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0006648 A1 | 1/2015 | Cao |
| 2015/0007049 A1 | 1/2015 | Langlois |
| 2015/0011242 A1 | 1/2015 | Nagaraj |
| 2015/0026623 A1 | 1/2015 | Horne |
| 2015/0031397 A1 | 1/2015 | Jouaux |
| 2015/0058781 A1* | 2/2015 | Malik .................. G06F 3/0488 715/772 |
| 2015/0131845 A1* | 5/2015 | Forouhar ........... G06K 9/00724 382/100 |
| 2015/0189349 A1 | 7/2015 | Nelson |
| 2015/0326902 A1 | 11/2015 | Levakov et al. |
| 2016/0008662 A1 | 1/2016 | Cronin |
| 2016/0014435 A1 | 1/2016 | Cronin |
| 2016/0014481 A1 | 1/2016 | Cronin |
| 2016/0062722 A1 | 3/2016 | Cronin |
| 2016/0066159 A1 | 3/2016 | Cronin |

FOREIGN PATENT DOCUMENTS

| | | |
|---|---|---|
| WO | WO 01/41884 | 6/2001 |
| WO | WO 2004/071598 | 8/2004 |
| WO | WO 2007/035878 A2 | 3/2007 |
| WO | WO 2007/035878 A3 | 3/2007 |
| WO | WO 2009/104921 | 8/2009 |
| WO | WO 2011/137100 | 11/2011 |
| WO | WO 2013/121215 | 8/2013 |
| WO | WO 2016/007962 | 1/2016 |
| WO | WO 2016/007965 | 1/2016 |
| WO | WO 2016/007967 | 1/2016 |
| WO | WO 2016/033366 | 3/2016 |
| WO | WO 2016/036571 | 3/2016 |

OTHER PUBLICATIONS

"Aspera to Showcase Digital Media Workflow and Broadcast IT Solutions at Broadcastasia 2013", Aspera News, Jun. 4, 2013.
Barney et al., Casey; "Visible Light Communication Systems", A Major Qualifying Project Report Submitted to the Faculty of the Worchester Polytechnic Institute, Mar. 28, 2014.
"Bright Leverages Cloud to Stream Sports Content Worldwide", by Sports Video Group, Jul. 9, 2013.
"Casio Unveils Prototype of Visible Light Communication System Using Smartphones at CES", Casio Computer Co., Ltd., Jan. 10, 2012.
"Camera Corps Robotic Cameras Systems to Televise Wimbledon Action", TVTechnology, Jun. 24, 2013. http://www.tvtechnology.com/equipment/0082/camera-corps-ro . . . .
"Cisco Stadium Vision Mobile", Cisco, May 21, 2014.
Coxworth, Ben; "NFL may track footballs using magnetic fields", Gizmag.com, Jun. 13, 2014 http://www.gizmag.com/football-tracking-magnetic-fields/3254 . . . .
"Create Innovative Services with Play APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Davies, Chris; "Philips LED lights flicker out a challenge to iBeacon and Gimbal", SlashGear, Feb. 17, 2014.
Dawson, Keith; "LiFi in the Real World" All LED Lighting—Illuminating the LED Community, Jul. 31, 2013.
Dinh et al., Thang; "Real time tracking using an active pan-tilt-zoom network camera", Proceeding IROS '09 Proceedings of the 2009 IEEE/RSJ International conference on Intelligent robots and systems. pp. 3786-3793, 2009.
"Engaged Sports Media Selects thePlatform as Centralized Cloud-based Video Publishing System", thePlatform, Oct. 31, 2013.
"EZ Display and EZ Remote for Android—User Guide", InFocus, Jul. 10, 2013.
Fisher et al., Brian E.; "Measurements corner: Three-dimensional position and orientation measurements using magneto-quasistatic fields and complex image theory", IEEE Xplore Abstract, Antennas and Propagation Magazines, IEEE (vol. 56, Iss. 1) Feb. 2014, pp. 160-173.
"Football camera provides ball's-eye view of the field", R&D Magazine Webcast, Feb. 27, 2013.
Gaddam et al., Vamsidhar R.; "Interactive Zoom and Panning from Live Panoramic Video", Nossdav '14 Proceedings of Network and Operating Systems Support for Digital Audio and Video Workshop, Mar. 19, 2014.
Gerhardt, Ryan; "Stadium App Lets Fans Order Food and Get On-Court Close Ups", PSFK.com, Feb. 22, 2013.
"GigaBroadcasting", Li-Fi Consortium, Date of Download: Aug. 14, 2014.
Gilpin, Lyndsey; "How GE created smart lights by integrating beacons into LEDs", TechRepublic, Jun. 6, 2014.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hammond, Teena; "Stadiums race to digitize: How sports teams are scrambling to keep Millenials coming to games", TechRepublic. Apr. 12, 2014.
"Hybrid's Sport Track Enables Robotic Cameras to Follow Action", TVTechnology, May 29, 2013 http://www.tvtechnology.com/news/0086/hybrids-sport-track-en . . . .
Jaffe, Jay; "MLB unveils revolutionary next-level tracking technology on defense", The Strike Zone, Mar. 3, 2014.
Kamenetzky, Andy; "Inside the Most Connected Sports Venue in America (And, No, It Ain't Cowboys Stadium)", Digital Trends, Nov. 6, 2013.
Kaplan, Daniel; "In-game locker room video still rare around NFL", SportsBusiness Journal, Sep. 30, 2013.
Kappeler et al., Uwe-Philipp; "3D Object Localizationi via Stereo Vision using an Omnidirectional and a Perspective Camera", Proceedings of the 2nd. Workshop on Omnidirectional Robot Vision. May 7, 2010. ISBN 978-88-95872-02-5 pp. 7-12.
Keith Price Bibliography Sports, Line Judge, Ball Position, Ball Tracking and Enhanced Displays, VisionBib. Date of download: Apr. 24, 2014 http://www.visionbib.com/bibliography/motion-f746ba1.html.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lavars, Nick; "Adidas miCoach Smart Ball tracks your striking power and finesse", Gizmag.com, May 28, 2014 http://www.gizmag.com/adidas-micoach-smart-soccer-ball/3228 . . . .
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
"Manchester City's Etihad Stadium is soon to be transformed into the Premier League's most technologically fan-friendly stadium", Machester City, May 8, 2013.
Montero, Eric, "Design and Implementation of Color-Shift Keying for Visible Light Communications", Sep. 2013, McMaster University.

(56) References Cited

OTHER PUBLICATIONS

Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consortium (VLCC), Apr. 26, 2012.
Pawate et al., Raj; "Remote display technology enhances the cloud's user experience", Texas Instruments, Aug. 2012.
Pingali et al., Gopal' "Lucentivision: Converting Real World Events Into Multimedia Experiences", Multimedia and Expo, 2000. ICME 2000. 2000 IEEE International Conference on vol. 3, Jul. 30, 2000-Aug. 2, 2000.
Povey, Gordon, "VLC for Location, positioning and navigation", Jul. 27, 2011, http://visiblelightcomm.com/vlc-for-location-positioning-and-n . . . .
"Proprietary Data Is Foundational", Contextual Database| Delivery Agent, Inc. Date of Download: Apr. 30, 2014 http://www.deliveryagent.com/products/contextual-database/.
RedFIR Precision Real-Time Tracking, Fraunhofer Institute for Integrated Circuits IIS. Oct. 7, 2015.
Ren et al., Jinchang; "A General Framework for 3D Soccer Ball Estimation and Tracking", Image Processing, 2004. ICIP '04. 2004 International Conference on (vol. 3) Date of Conference: Oct. 24-27, 2004.
Rufo et al., J.; "Visible Light Communication Systems for Optical Video Transmission", Microwave and Optical Technology Letters, vol. 52, No. 7, Jul. 2010.
"Streaming Video Online Databases", MLibrary, University of Michigan. Maintained by: Clara Slavens, last modified: Apr. 17, 2014.
"Surveillance Monitoring—Networking Security—PTZ Network Cameras", Panasonic USA. http://www.panasonic.com/business/psna/products-surveillance-monitoring/network-security-cameras/ptz-cameras.aspx Date of Download: Apr. 29, 2014.
Swedberg, Claire; "RFID Helps Soccer Teams Keep Their Eye on the Ball, and Their Players", RFID Journal, Mar. 13, 2012.
Thanigavel, M.; "Li-Fi Technology in Wireless Communication", International Journal of Engineering Research & Technology (IJERT), ISSN: 2278-0181, vol. 2 Issue 10, Oct. 2013.
Wells, Alton; "How would you build a gimball system that could track any point within a 360 degree "sphere"", AskEngineers. Posted on Aug. 26, 2013.
Wiedeman, Reeves; "Sporting Kansas City Makes the Stadium More Like Your Couch", BloombergBusinessweek, Jul. 18, 2013.
Woodward, Alexander; Delmas, Patrice; "Computer Vision for Low Cost 3-D Golf Ball and Club Tracking", CITR, University of Auckland, Dept. Computer Science, New Zealand.Date of Download: Apr. 29, 2014.
Won, Eun Tae; "Visible Light Communication: Tutorial", Project: IEEE P802.15 Working Group for Wireless Personal Area Networks (WPANs), Mar. 9, 2008.
"World Cup 2014: Goalline technology TV process reviewed", BBC Sport, Jun. 16, 2014. http://www.bbc.com/sport/0/football/27864393.
Yan, Fei; "Tennis Ball Tracking for Automatic Annotation of Broadcast Tennis Video", Centre for Vision, Speech and Signal Processing, School of Electronics and Physical Sciences, Jun. 2007.
Yu, Shuang; "Automatic Basketball Tracking in Broadcast Basketball Video", A Thesis submitted in partial fulfillment of the requirements for the Degree of Master of Science in The Faculty of Graduate Studies. Aug. 2012.
PCT Application No. PCT/US2015/033613 International Search Report and Written Opinion mailed Sep. 1, 2015.
PCT Application No. PCT/US2015/040207 International Search Report and Written Opinion mailed Oct. 5, 2015.
PCT Application No. PCT/US2015/040215 International Search Report and Written Opinion mailed Sep. 29, 2015.
PCT Application No. PCT/US2015/040223 International Search Report and Written Opinion mailed Oct. 1, 2015.
U.S. Appl. No. 14/798,271 Office Action mailed Nov. 2, 2015.
U.S. Appl. No. 14/788,748 Office Action mailed Nov. 5, 2015.
U.S. Appl. No. 14/798,294 Office Action mailed Nov. 2, 2015.
U.S. Appl. No. 14/838,129 Office Action mailed Oct. 29, 2015.
PCT Application No. PCT/US2015/047265 International Search Report and Written Opinion mailed Dec. 7, 2015.
U.S. Appl. No. 14/798,286 Office Action mailed Dec. 4, 2015.
U.S. Appl. No. 14/829,184 Office Action mailed Nov. 23, 2015.

\* cited by examiner

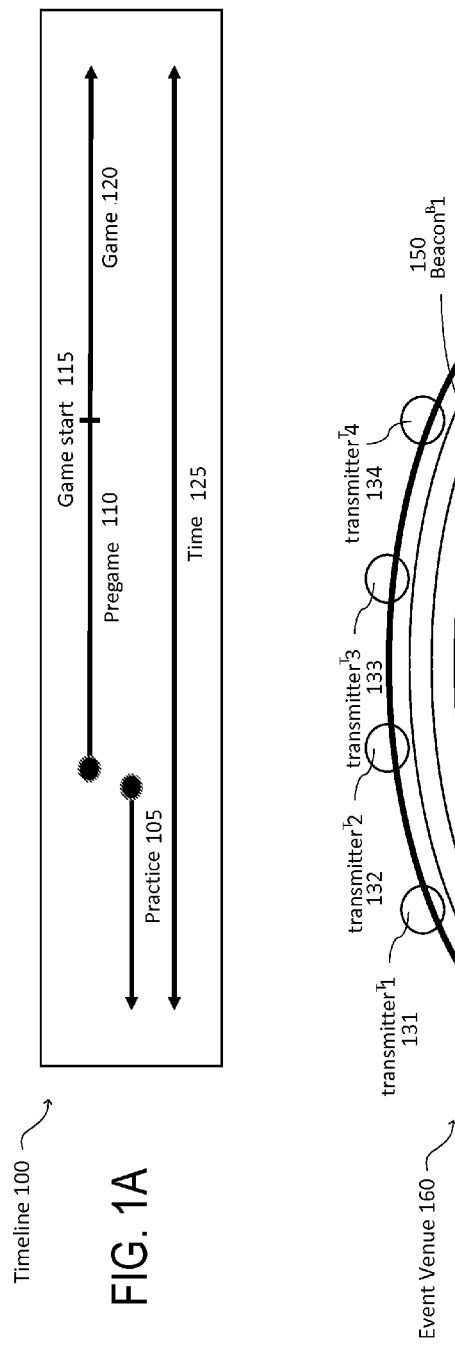
FIG. 1A
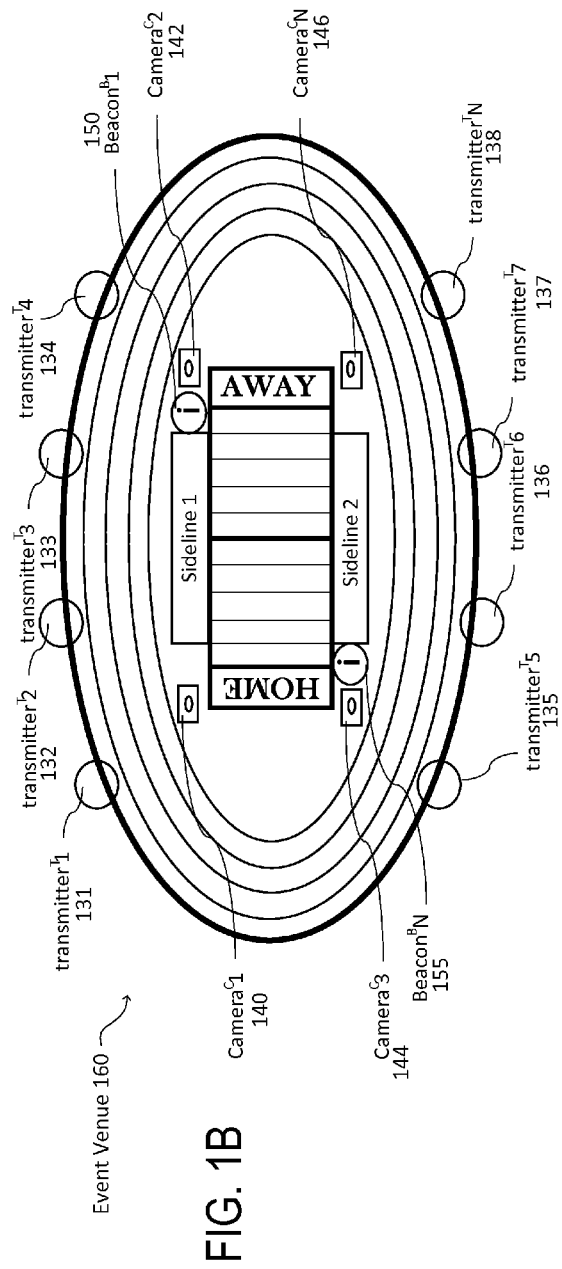
FIG. 1B
FIG. 1C

Fantasy Football GUI 705

Pregame = Injury Report 715

| Position 720 | Number 725 | Owner 730 | Injury Report 735 | Injury 740 |
|---|---|---|---|---|
| QB | 11 | Patriots | Active | N/A |
| QB | 31 | Patriots | Probable | Knee |
| TE | 17 | Patriots | Not Playing | Hamstring |
| QB | 7 | Broncos | Active | Elbow |
| ... | ... | ... | ... | ... |

In Game = Trainer 745

| Position 750 | Number 755 | Owner 760 | Replacement/Back-up 765 | Injury 770 |
|---|---|---|---|---|
| QB | 11 | Patriots | N/A | -- |
| QB | 31 | Patriots | N/A | -- |
| TE | 17 | Patriots | 19 | Hamstring |
| QB | 7 | Broncos | 16 | Back |
| ... | ... | ... | ... | ... |

FIG. 7

EVENT AND FANTASY LEAGUE DATA TRANSMISSION TO EVENTGOER DEVICES

CROSS-REFERENCE TO RELATED APPLICATIONS

The present application claims the priority benefit of U.S. provisional application No. 62/029,655 filed Jul. 28, 2014 and entitled "Offline In-Event Data For Fans For Fantasy Football," the disclosure of which is hereby incorporated by reference.

BACKGROUND

Field of Invention

The present invention generally relates to event venue communications systems. More specifically, the present invention relates to wireless transmission of information recorded at a performance area of an event venue or relevant to fantasy league games to mobile devices in an eventgoer area of the event venue.

Description of the Related Art

Larger events, such as concerts or sporting events, are typically held in larger event venues, such as stadiums. Typically, event venues include a performance area, such as a sport field, or a sport arena, or a sport court, or a concert stage, or a lecture stage. Typically, event venues include an eventgoer area, such as stadium seating, bleachers, theater seating, or a standing room eventgoer area. Typically, some parts of the eventgoer area provide better views or better acoustics of parts of events occurring within the performance area than other parts of the eventgoer area. Some portions of an event (e.g., sport team "huddle" meetings), even though they occur at the performance area, might not normally be visible or audible to the eventgoer area at all.

Fantasy leagues (e.g., such as "fantasy football," "fantasy baseball," "fantasy basketball") are popular statistical games allowing fantasy league players compete against each other by managing "fantasy" groups of real sport players or position units selected from real sports teams, and win by comparing real statistics associated with those sport players (e.g., touchdowns or goals made by each sport player, interceptions or blocks by each sport player, defenses by each sport player, offensive passes by each sport player, and other sport plays or moves by each sport player) and position units. Fantasy league players playing in a fantasy league are often interested in learning as much as they can about individual sport players (e.g., learning about sport players' injuries, diets, relationships, recreational habits, personal lives, or anything else that might affect their ability to physically play well or mentally focus well) in order to select the most competitive "fantasy" group.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Advertising a brand, a product, or a service is often an effective means for a business to obtain new customers and reinforce loyalty in existing customers. Advertising can be particularly effective if targeted at the correct audience, such as when a sport fan is told that buying a particular product will support his/her favorite team. Often, seating at sport stadiums during sporting events is divided into "sections" devoted to fans of one of the teams playing.

Advertising can be a particularly useful source of revenue during sporting events, such as football games. By using advertising, revenues may be raised, the cost of tickets may be brought down, and more fans may be allowed to go to a particular sports game.

Thus, a means of event venue communication with eventgoers participating in fantasy leagues is needed.

SUMMARY OF THE CLAIMED INVENTION

One exemplary method for event venue communication includes receiving recorded data from a recording device located at a performance area of an event venue. The method also includes obtaining injury data regarding one or more players prior to a game. The method also includes transmitting the recorded data and the injury data to one or more mobile devices located within an eventgoer area of the event venue using one or more local wireless transmitters.

One exemplary system for event venue communication includes a recording device, one or more local wireless transmitters, and a transmission device. Execution of instructions stored in a memory of the transmission device by a processor of the transmission device may perform certain system operations. The system operations may include receiving recorded data from a recording device located at a performance area of an event venue. The system operations may also include obtaining injury data regarding one or more players prior to a game. The system operations may also include transmitting the recorded data and the injury data to one or more mobile devices located within an eventgoer area of the event venue using one or more local wireless transmitters.

One exemplary non-transitory computer-readable storage medium is also described, the non-transitory computer-readable storage medium having embodied thereon a program executable by a processor to perform an exemplary program method for event venue communication that includes receiving recorded data from a recording device located at a performance area of an event venue. The program method also includes obtaining injury data regarding one or more players prior to a game. The program method also includes transmitting the recorded data and the injury data to one or more mobile devices located within an eventgoer area of the event venue using one or more local wireless transmitters.

BRIEF DESCRIPTION OF THE DRAWINGS

FIG. 1A illustrates an exemplary event timeline for an exemplary sporting event.

FIG. 1B illustrates an exemplary event venue ecosystem.

FIG. 1C illustrates exemplary event information that may be gathered during an event and transmitted by the beacons.

FIG. 7 illustrates an exemplary fantasy football graphical user interface.

DETAILED DESCRIPTION

Figure 2:
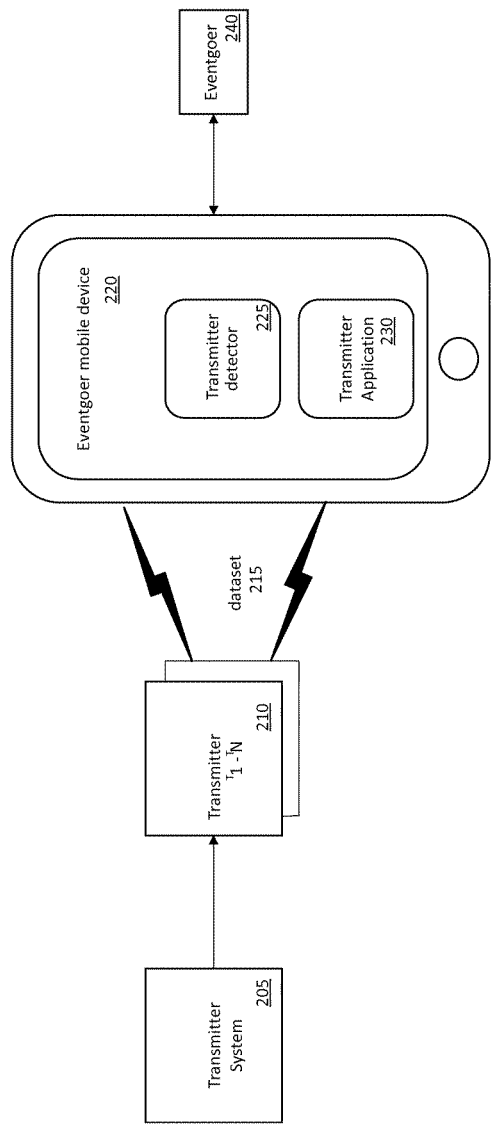
FIG. 2 illustrates exemplary data communications between one or more transmitters and an exemplary mobile device.

An event venue with a performance area (e.g., a stage, a sport field) and an eventgoer area (e.g., a stadium seating section) may include beacons and cameras throughout the performance area. The beacons and cameras may each record event occurrence data (e.g., audiovisual data) of particular occurrences (e.g., sport goals, songs played) during an event (e.g., sports game, concert) at the event venue. Other data, such as sports injury data and sports player replacement data, may also be gathered before or during the event. The beacons and cameras may send the event occurrence data and the other data to a transmission system. The transmission system may convert the event occurrence data to a transmittable format and may then output it through one or more local wireless transmitters. Eventgoers' mobile devices in the transmission zones of these transmitters may then receive the data.

FIG. 1A illustrates an exemplary event timeline for an exemplary sporting event. The timeline 100 is a graphic representation of linear events (some of which may occur in parallel) over a period of time 125 that includes time intervals taking place before and during a sports event. The timeline 100 of FIG. 1A illustrates, for example, a warm-up practice 105, a pre-game show or ceremony 110, the start of the game 115, and the sports game 120 itself (e.g., which may take place both in a main play area, such as a field or court, an in a side "discussion" area, such as the sidelines). The pre-game show or ceremony 110 may include, for example, replayed highlights of previous games, or discussions about the players, or interviews with players.

The event timeline of a sports event also may also include other distinct time periods, such as a planned break in play (e.g., a half-time break or lunch break) or a planned end to the sport event.

Other types of events, such as concerts, may have other types of significant time periods, such as opening acts, intermissions, and a feature presentation/act.

FIG. 1B illustrates an exemplary event venue ecosystem.

The event venue is illustrated in FIG. 1B as a sport stadium, but may be any type of event venue used to host any type of event, public or private. For instance, the event venue may be a venue for any type of entertainment or cultural events that are presented at a theater, gymnasium, church, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

The event venue ecosystem includes a number of transmitters 210, identified as transmitter T1 131, transmitter T2 132, transmitter T3 133, transmitter T4 134, transmitter T5 135, transmitter T6 136, transmitter T7 137, and transmitter TN 138.

Each transmitter of the transmitters 210 may be any type of information transmission system. For example, each transmitter may transmit information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance transmitter, an electromagnetic radiation transmission module, a visible light communication (VLC) transmission lamp/laser/module, a laser transmission module, a speaker (e.g., audible sound transmitter, ultrasonic transmitter, infrasonic transmitter) with or without noise cancelling features, or some combination thereof. Each transmitter may include any number of sub-transmitters.

Each of the transmitters may emit a transmission through a substantially cone-shaped "transmission zone," such as the transmission zone 220 of transmitter T1 131. All (or at least a subset of) mobile devices 210 located within such as transmission zone may receive a transmission sent by the transmitter. A transmitter may have a substantially cone-shaped transmission zone (e.g., as illustrated with respect to transmission zone 220), for example, if the transmitter T1 131 is a visible light communication (VLC) transmission lamp (e.g., a fluorescent lamp or incandescent lamp or light emitting diode emitting light at least partly within the visible light spectrum), which communicates information via light. A transmitter may also have a substantially cone-shaped transmission zone if, for example, the transmitter is a speaker, such as an audible-frequency speaker, an ultrasonic-frequency speaker, an infrasonic frequency speaker, or some combination thereof.

The transmitter can alternately have a differently-shaped transmission zone, such as a transmission zone that is at least partly sphere-shaped or ovoid-shaped. For example, the transmitter could be a local Bluetooth transmitter transmitting circularly around to surrounding recipient devices.

The transmitters 210 may be used inside of or otherwise associated with an event venue during an event. For example, the transmitters may be used during entertainment or cultural events that are presented at a theater, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

The event venue ecosystem also includes a number of cameras, identified as camera C1 140, camera C2 142, camera C3 144, and camera CN 146. The cameras may be any type of cameras, and may record and output image data, video data, or some combination thereof. The cameras may also include (or in some cases, may be replaced with) microphones to record and output audio data. The cameras may be positioned to record occurrences within the performance area of the event venue (e.g. the field, the court, the play area, the stage) as well as a "side" performance area (e.g., the sidelines, backstage).

The cameras may be used to record, for example, specific gameplay occurrences during play of a sport event (e.g., a particular play, a particular goal, a particular pass, a particular steal, a particular touchdown, a particular foul, a particular fumble) out of play of a sporting event (e.g., a play-break team huddle, a locker room team discussion, a water cooler team discussion). The cameras may be used to record other event occurrences, such a music artist performing during a concert (and/or discussing backstage before/after the concert), an acting performance (and/or a dress rehearsal before or interviews before/after), a lecture, a religious event, or any other type of performance that might take place in a particular event venue with eventgoers.

The cameras may use a variety of recording technologies, and may record any band of electromagnetic frequencies. For example, the cameras may record visible light, thermal (e.g., infrared), microwave, radio, or ultraviolet frequencies. The cameras may use low-light or night vision technologies for nighttime events. The cameras may record using magnetic tapes, optical disks, or any type of computer-associated memory or storage systems, such as a memory 920, mass storage device 930, or portable storage device 940.

The event venue ecosystem also includes a number of beacons, identified as beacon B1 150 and beacon BN 155.

The beacons of FIG. 1B may be used to transfer audio and video data from the performance area of the event venue to the transmitters 210. For example, the cameras may be communicatively coupled to the beacons, so that once the cameras record an event occurrence, data (e.g., images, video, or audio) pertaining to the event occurrence, the data can be sent to the transmitters 210, where it can be transmitted to eventgoer mobile devices 220. Each beacon may be associated with one or more of the cameras, or may be independent of any of the cameras illustrated in FIG. 1B. Each beacon may include its own cameras and/or microphones. The beacons may include wireless transmitters and/or wired transmitters that may be used to send any audio/video that is recorded by or received by the beacon to a transmitter system 205 running a transmitter software 380 with a graphical user interface (GUI) 350 (e.g., see FIG. 3).

The beacons may include wireless connectivity functionality, such as a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance power transmitter, an electromagnetic transmission module, a visible light communication (VLC) transmission module, a laser transmission module, an ultrasonic transmission module, an infrasonic transmission module, or some combination thereof. The beacons may include wired connectivity functionality, such as a Universal Serial Bus (USB) port, a FireWire port, an Ethernet port, a modem port, a fiber optic cable port, a Lightning port, a Thunderbolt port, customized audio jack port, or a proprietary data transfer cable port.

FIG. 1C illustrates exemplary event information that may be gathered during an event and transmitted by the beacons. For example, during the pre-game time period 110, the beacons may gather pre-game sideline data 170, which may include, for example, injury reports detailing the extent of how various players are injured. During the in-game time period 120, the beacons may also gather in-game sideline data 175, which may include back-up reports identifying backup players.

FIG. 2 illustrates exemplary data communications between one or more transmitters and an exemplary mobile device.

Figure 3:
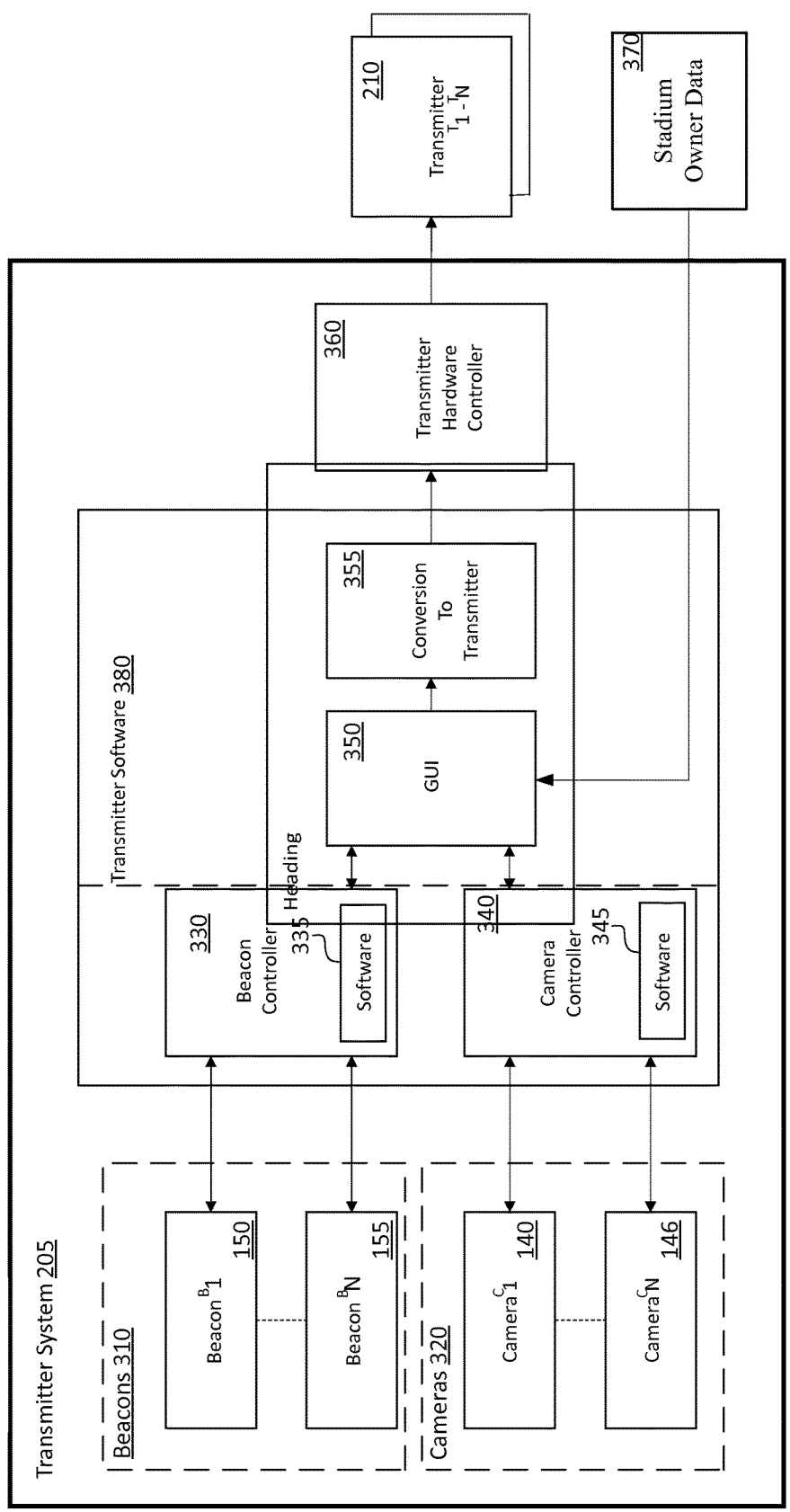
FIG. 3 illustrates an exemplary transmitter system.

In particular, the communications of FIG. 2 begin with the transmitter system 205. At the communication stage illustrated in FIG. 2, a particular dataset 215 (e.g., including images, recorded audio, streaming/live audio, recorded video, streaming/live video, and/or text) has already been chosen at the transmitter system 205 (e.g., automatically via software executed by the transmitter system 205 or manually by an administrator using a graphical user interface 350 executed at the transmitter system 205 as illustrated in FIG. 3) to transmit via one or more of the transmitters 210. Similarly, the particular transmitters that will be used to transmit the dataset 215 may have already been chosen and identified to the transmitter system 205 (e.g., using the graphical user interface 350), or the transmitter system 205 may automatically determine the best transmitter(s) to use for a particular dataset 215. For example, the transmitter system 205 may select transmitters whose transmission zones are farthest away from a particular event occurrence depicted in a video included in the dataset 215 (e.g., a sports foul) so that faraway eventgoers can have a good view of the event occurrence despite being far away from it.

The mobile device 220 of FIG. 2 may be associated with one of the eventgoers 240 who may be located in an eventgoer area (e.g., stadium seating, bleachers, theater seating, or a standing room eventgoer area) of the event venue of FIG. 1B, or of a different type of event venue. The mobile device 220 may be any type of computing device, such as the computing device 900 of FIG. 9. The mobile device 220 may be, for example, a smartphone, a tablet device, a wearable device (e.g., a smart watch, a smart bracelet/jewelry, or smart glasses), a laptop computer, a portable video game console, a portable e-reader device, or a portable media player device.

The mobile device 220 may include a transmission detector 225. The transmission detector 225 may include, for example, the ability to receive information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction receiver, a magnetic resonance receiver, an electromagnetic radiation receiver module, a visible light communication (VLC) receiver module, a laser transmission receiver module, a microphone (e.g., audible sound receiver, ultrasonic receiver, infrasonic receiver) with or without noise cancelling features, or some combination thereof. The transmission detector 225 may include any number of sub-receivers. The transmission detector 225 in particular may be configured to be able to receive and/or decode at least a dataset 215 sent by one or more of the transmitters 210.

Figure 9:
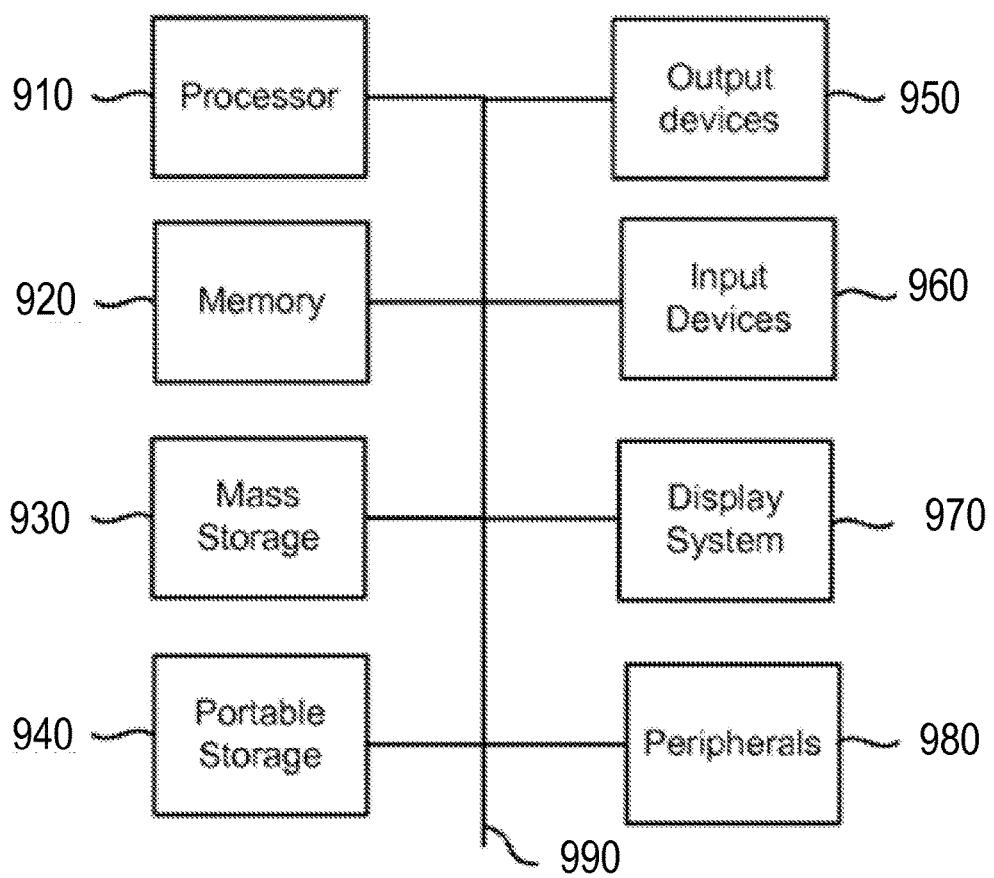
FIG. 9 is a block diagram of an exemplary computing device that may be used to implement an embodiment of the present invention.

The mobile device 220 may also include a display (not labeled), which may be any type of display system 970 described in FIG. 9.

The mobile device 220 may also include a transmitter software app 230 through which the information transmitted from the transmitters 210 (e.g. advertisements and/or queue information) may be displayed by the mobile device 220. The transmitter software app 230 may be an operating system, or it may alternately be a more specialized software application, such as a social media platform software application, a news reader application, a feed reader application, an email reader application, or a message reader application.

The mobile device 220 may also include a fantasy league application 235, which may be an application through which a user of the mobile device 220 (e.g., an eventgoer) may access his/her personal fantasy sport team, select players, and learn information about various players. The fantasy league application 235 may interface with the transmitter application 230 to learn information about teams and players while a sports event is occurring and while the eventgoer using the mobile device 220 is at the event venue in which the sports event is occurring. The fantasy league application 235 may be updated in realtime using information gathered by the transmitter detector 225 and organized by the transmitter application 230. The fantasy league application 235 may include a fantasy league graphical user interface (GUI), such as the fantasy football GUI 705 illustrated in FIG. 7.

FIG. 3 illustrates an exemplary transmitter system.

In particular, the transmitter system 205 of FIG. 3 includes a set of beacons 310 (e.g. including beacon B1 150 through beacon BN 155) connected to a beacon controller 330. The beacon controller 330 is a controller subsystem for controlling the beacons 310 and receiving beacon data from the beacons 310. The beacon controller 330 may be a software routine of the transmitter software 380, may be a separate computer system 900, or some combination thereof. Either way, the beacon controller 330 may be associated with a wired or wireless communication module (not shown) capable of receiving data transmissions directly from one or more of the beacons 310. The beacon controller 330 may include or be associated with a processor, which may execute a beacon software 335 stored in a memory/storage (e.g., a memory 920, a mass storage 930, or a portable storage 940) associated with the beacon controller 330 and/or the transmitter system 205. The beacon software 335 may be used to support various functions of the beacon controller 330 (e.g., the beacon software 335 may include beacon connection software drivers).

The transmitter system 205 of FIG. 3 also includes a set of cameras 320 (e.g. including camera C1 140 through camera CN 146) connected to a camera controller 340. The camera controller 340 is a controller subsystem for controlling the cameras 320 and receiving camera data from the cameras 320. The camera controller 340 may be a software routine of the transmitter software 380, may be a separate computer system 900, or some combination thereof. Either way, the beacon controller 330 may be associated with a wired or wireless communication module (not shown) capable of receiving data transmissions directly from one or more of the cameras 320. The camera controller 340 may include or be associated with a processor, which may execute a camera software 345 stored in a memory/storage (e.g., a memory 920, a mass storage 930, or a portable storage 940) associated with the camera controller 340 and/or the transmitter system 205. The camera software 345 may be used to support various functions of the camera controller 340 (e.g., the camera software 345 may include camera connection software drivers).

The transmitter system 205 of FIG. 3, and in particular the transmitter software 308, also includes a graphical user interface (GUI) 350, which receives data from the beacon controller 330 and the camera controller 340 as inputs. The GUI 350 may be accessed by an administrative user associated with the event venue, the transmitters, the beacons, the cameras, the event organizers (e.g., sponsors, sports associations, sports teams, concert organizers, educational administrative groups, church administrative groups), the performers (e.g., the sports teams, musical artists, lecturers, speakers). The GUI 350 may be used to select a dataset 215 (e.g., a particular set of data including images, recorded audio, streaming/live audio, recorded video, streaming/live video, and/or text) from the beacons 310 and/or from the cameras 320 that should be transmitted to eventgoer mobile devices 220 as illustrated in FIG. 2. The GUI 350 may also be used to select at least a subset including one or more transmitters (e.g., transmitter T2 132 and transmitter T6 136) of the set of transmitters 210 (which includes, in the event venue example of FIG. 1B, transmitter T1 131 through transmitter TN 136) through which the identified dataset 215 should be transmitted. In some cases, all of the transmitters 210 may be selected.

In an alternate embodiment (not shown), the dataset 215 may be selected by a software routine of the transmitter system 205 and transmitter software 380. For example, if the software detects that a ball, puck, Frisbee, or person has entered a "goal" or "touchdown" area, a dataset 215 may automatically be generated including video/audio/images of this occurrence. Similarly, the software routine of the transmitter system 205 and transmitter software 380 may automatically select at least a subset of the transmitters 210 over which to broadcast a particular dataset 215, for example by selecting transmitters with transmission zones nearest the location of the event occurrence, transmitters with transmission zones farthest from the location of the event occurrence, all transmitters, or randomly selected transmitters.

Once the dataset 215 is identified (e.g., either manually at the GUI 350 or automatically by a software routine of the transmitter system 205), and the transmitters to transmit the dataset 215 have been selected (e.g., either manually at the GUI 350 or automatically by a software routine of the transmitter system 205), the dataset 215 is optionally passed through a conversion algorithm 355, which may convert the dataset 215 to a format which may be transmitted by one or more of the transmitters 210. The dataset 215 (converted or not) may then be sent to a transmitter hardware controller 360, which then directs the dataset 215 (converted or not) to the individual identified transmitters of the set of transmitters 210 through which it is to be transmitted.

Figures 4A, 4B:
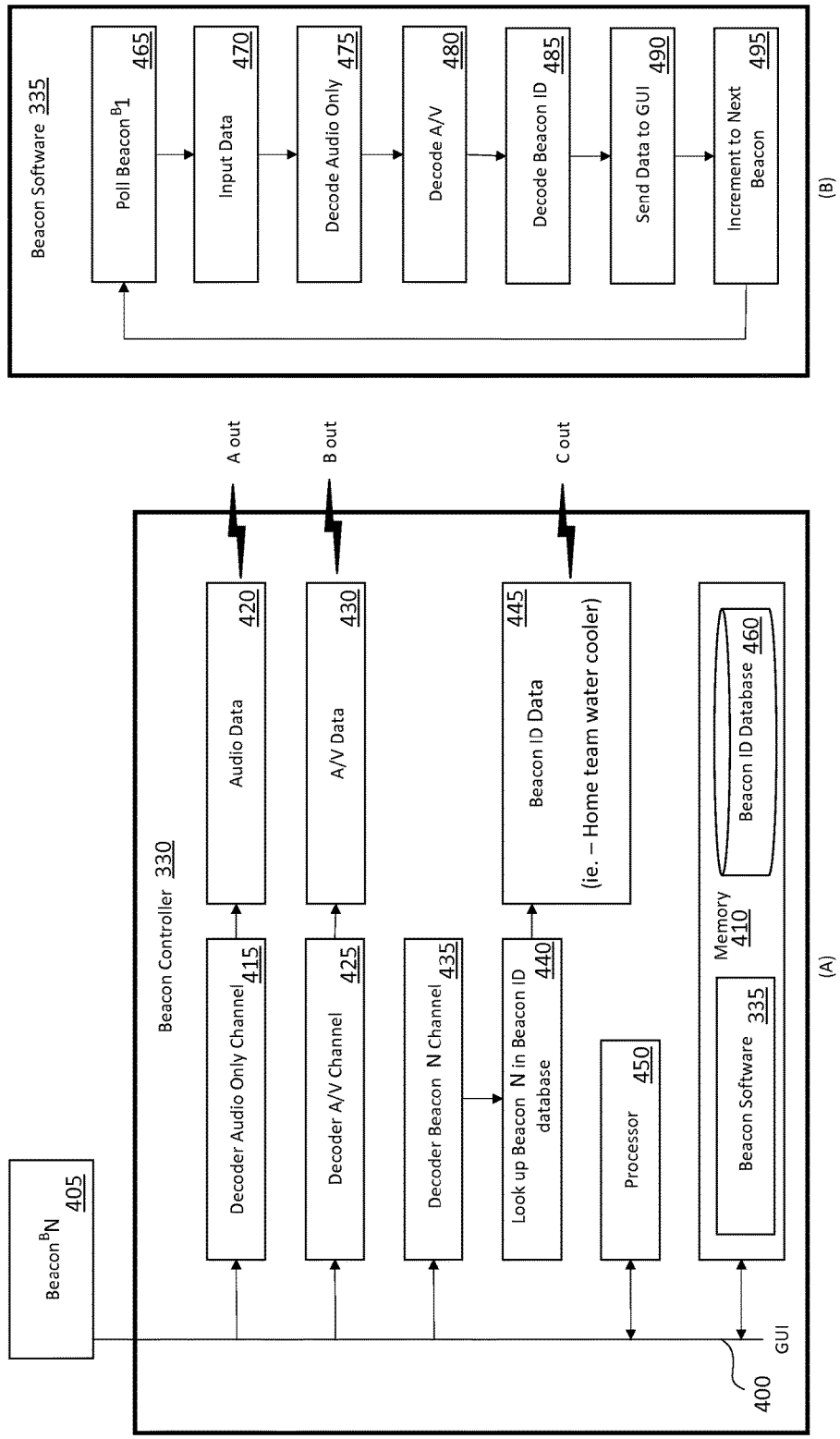
FIG. 4A illustrates an exemplary beacon and beacon controller.
FIG. 4B is a flow diagram illustrating exemplary beacon software operations.

FIG. 4A illustrates an exemplary beacon and beacon controller.

The exemplary beacon BN 405 is communicatively coupled (e.g., in a wired or wireless manner) to the beacon controller 330. The beacon controller 330 includes an audio-only-channel decoder 415, which is a beacon channel decoder that reads audio data from one or more microphones of the beacon 405 and outputs audio data 420. The beacon controller 330 includes an audiovisual-channel decoder 425 ("A/V" channel decoder 425), which is a beacon channel decoder that reads audio data, visual data, or some combination thereof (e.g., a video with sound) from one or more cameras and/or microphones of the beacon 405 and outputs AN data 430.

The beacon controller 330 also includes a Beacon N channel decoder 435, which can identify which beacon of a set of beacons 310 is transmitting data to the beacon controller 330. Such operations may include a lookup operation 440, which includes looking up an identifying element of data from the beacon 405 to identify the beacon 405 in a beacon identifier ("beacon ID") database 460. The beacon controller 330 can then output specific beacon identifier information 445, which may for example identify a type and/or location of the beacon (e.g., home team water cooler beacon located at or near the home team's water cooler).

The beacon controller 330 may also include a processor 450 and a memory 410 (which may be a memory 920, a mass storage 930, a portable storage 940, or some combination thereof). The memory 410 may include the beacon software 335 and the beacon identifier ("beacon ID") database 460. The beacon controller 330 may further store and execute a GUI 400, which may include the GUI 350 of the transmitter software and may include other beacon-specific GUI elements as well.

FIG. 4B is a flow diagram illustrating exemplary beacon software operations.

At step 465, the beacon software 335 may begin by polling a first beacon B1 to see if the beacon has produced any data and/or sent any data to the beacon controller 330. At step 470, any data input sent by the beacon is received. At step 475, the beacon software 335 decodes the audio data channel of the beacon's received input data to produce audio data. At step 480, the beacon software 335 decodes the audiovisual data channel of the beacon's received input data to produce audio data, visual data, or some combination thereof. At step 485, the beacon software 335 decodes a beacon identifier from the beacon's received input data and identifies the beacon. At step 490, the beacon software 335 sends any data decoded from the beacon's received input data to the GUI 350 (and optionally to the GUI 400). At step 495, the beacon software 335 performs the beacon software operations again for the incrementally next beacon, starting from step 465.

Figures 5A, 5B:
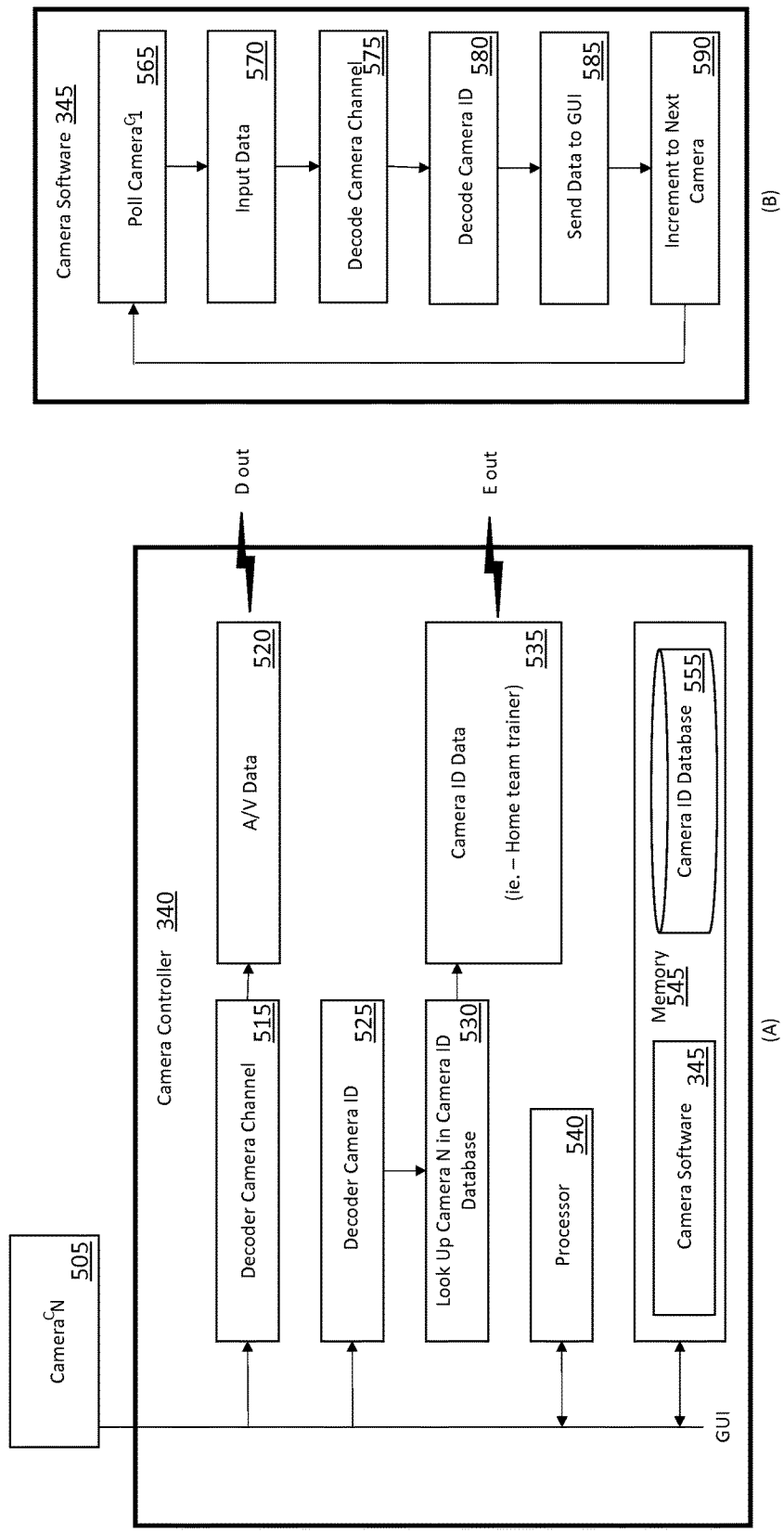
FIG. 5A illustrates an exemplary camera and camera controller.
FIG. 5B is a flow diagram illustrating exemplary camera software operations.

FIG. 5A illustrates an exemplary camera and camera controller.

The exemplary camera CN 505 is communicatively coupled (e.g., in a wired or wireless manner) to the camera controller 340. The camera controller 340 includes an camera-channel decoder 515, which is a camera channel decoder that reads audio data, visual data, or some combination thereof (e.g., images, video, video with sound) from one or more cameras and/or microphones of the camera 505 and outputs A/V data 520.

The camera controller 340 also includes a Camera Identifier ("ID") channel decoder 525, which can identify which camera of a set of cameras 320 is transmitting data to the camera controller 340. Such operations may include a lookup operation 530, which includes looking up an identifying element of data from the camera 505 to identify the camera 505 in a camera identifier ("camera ID") database 555. The camera controller 340 can then output specific camera identifier information 535, which may for example identify a type and/or location of the camera (e.g., home team trainer camera following the home team's trainer).

The camera controller 340 may also include a processor 540 and a memory 545 (which may be a memory 920, a mass storage 930, a portable storage 940, or some combination thereof). The memory 545 may include the camera software 345 and the camera identifier ("camera ID") database 555. The camera controller 340 may further store and execute a GUI 500, which may include the GUI 350 of the transmitter software and may include other camera-specific GUI elements as well.

FIG. 5B is a flow diagram illustrating exemplary camera software operations.

At step 565, the camera software 345 may begin by polling a first camera C1 to see if the camera has produced any data and/or sent any data to the camera controller 340. At step 570, any data input sent by the camera is received. At step 575, the camera software 345 decodes the camera data channel of the camera's received input data to produce audio data, visual data, or some combination thereof. At step 580, the camera software 345 decodes a camera identifier from the camera's received input data and identifies the camera. At step 585, the camera software 345 sends any data decoded from the camera's received input data to the GUI 350 (and optionally to the GUI 500). At step 590, the camera software 345 performs the camera software operations again for the incrementally next camera, starting from step 565.

Figure 6:
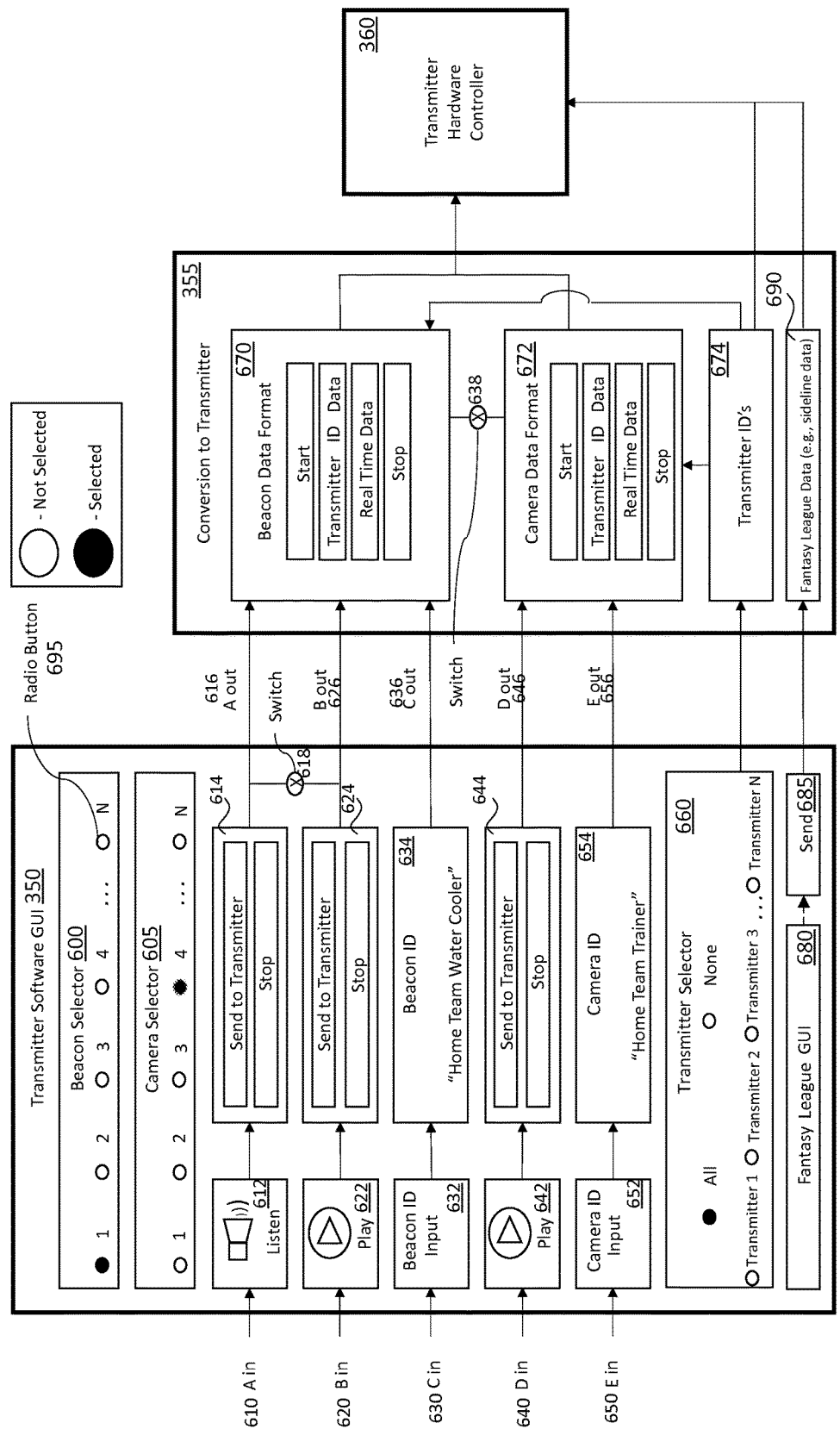
FIG. 6 illustrates an exemplary transmitter software graphical user interface and various transmitter system operations.

FIG. 6 illustrates an exemplary transmitter software graphical user interface and various transmitter system operations.

The transmitter software GUI 350 of FIG. 6 includes various GUI elements. In particular, the transmitter software GUI 350 of FIG. 6 includes a beacon selector 600, which allows a user to select one or more of the beacons 310 to receive data from using a radio button interface 695 (beacon B1 is currently selected in FIG. 6). The transmitter software GUI 350 of FIG. 6 also includes a camera selector 605, which allows a user to select one or more of the cameras 320 to receive data from using a radio button interface 695 (camera C1 is currently selected in FIG. 6). The transmitter software GUI 350 of FIG. 6 also includes a transmitter selector 660, which allows a user to select one or more of the cameras 320 to receive data from using a radio button interface 695 (all transmitters are currently selected in FIG. 6). The radio button interfaces 995 may be replaced with other types of selection interfaces, such as checkbox interfaces, or text-selection based interfaces, or image or grid selection based interfaces, for example.

The transmitter software GUI 350 may receive an audio input 610 from a beacon or beacon controller 330. The GUI 350 may allow the user to listen to the audio input 610 through an audio-playing interface 612. A sending interface 614 then allows the user to choose to send the audio from the audio input 610 to the transmitter(s) selected using the transmitter selector 660 (e.g., all transmitters according to the current selection in interface 660 of FIG. 6), or to stop transmission. If the audio is selected for transmission, it is sent to the "conversion to transmitter" operations 355 as an audio output 616 to convert from a beacon data format 670 to a transmitter type format before being sent to transmitter hardware controller 360.

The transmitter software GUI 350 may receive an audiovisual input 620 (audio, images, video, or some combination thereof) from a beacon or beacon controller 330. The GUI 350 may allow the user to play back to the audiovisual input 620 through an audiovisual-playing interface 622. A sending interface 624 then allows the user to choose to send the audiovisual data from the audiovisual input 620 to the transmitter(s) selected using the transmitter selector 660

(e.g., all transmitters according to the current selection in interface 660 of FIG. 6), or to stop transmission. If the audiovisual data is selected for transmission, it is sent to the "conversion to transmitter" operations 355 as an audiovisual data output 626 to convert from a beacon data format 670 to a transmitter type format before being sent to transmitter hardware controller 360.

The transmitter software GUI 350 may receive at least one beacon ID input 630, which may be checked at an interface 632. A sending interface 634 may in some cases allow a user to select whether the beacon ID is sent to the transmitter, though in some cases it is sent automatically, or in other cases, it is not sent at all. If the beacon ID is to be sent to the transmitter, it is sent as a beacon ID output 636 and may pass through the "conversion to transmitter" operations 355 to convert from a beacon data format 670 to a transmitter type format before being sent to transmitter hardware controller 360.

The transmitter software GUI 350 may receive an audiovisual input 640 (audio, images, video, or some combination thereof) from a camera or camera controller 340. The GUI 350 may allow the user to play back to the audiovisual input 640 through an audiovisual-playing interface 642. A sending interface 644 then allows the user to choose to send the audiovisual data from the audiovisual input 640 to the transmitter(s) selected using the transmitter selector 660 (e.g., all transmitters according to the current selection in interface 660 of FIG. 6), or to stop transmission.

The transmitter software GUI 350 may receive at least one camera ID input 650, which may be checked at an interface 652. A sending interface 654 may in some cases allow a user to select whether the camera ID is sent to the transmitter, though in some cases it is sent automatically, or in other cases, it is not sent at all. If the camera ID is to be sent to the transmitter, it is sent as a camera ID output 656 and may pass through the "conversion to transmitter" operations 355 to convert from a camera data format 670 to a transmitter type format before being sent to transmitter hardware controller 360.

In some cases, hardware or software switches may be also incorporated, such as switch 618 allowing the user to switch between audio-only or audiovisual data from a beacon, or a switch 638 allowing the user to switch from running beacon data format conversion operations 670 (converting beacon data format to transmitter data format) to running camera data format conversion operations 672 (converting camera data format to transmitter data format).

The output of the transmitter selector 660 may also be sent to the "conversion to transmitter" operations 355 as a list of transmitter identifiers 674, which may inform the beacon data format conversion operations 670 and camera data format conversion operations 672, so that these operations convert data into the correct format for each transmitter identified. The set of selected transmitters may include different types of transmitters that accept different formats of data, which may require different conversion operations.

The beacon data format conversion operations 670 (converting beacon data format to transmitter data format) and the running camera data format conversion operations 672 (converting camera data format to transmitter data format) both include the abilities to start sending converted data to a transmitter, to check the transmitter identifier data 674, to read the data that the transmitter is outputting, and to stop transmission of converted data.

The transmitter software GUI 350 may also include or link to a fantasy league GUI 680 (e.g., the fantasy football GUI 705 of FIG. 7). The fantasy league GUI 680 may include information about particular sports players, such as sport positions played by the sports players, injuries of the sports players, team/owner information associated with the sports players, or other information as shown in the fantasy football GUI 705 of FIG. 7. A sending interface 685 may then allow a user of the GUI 350 to select whether fantasy league data 690 (e.g., including fantasy football sideline data) from the fantasy league GUI 680 is sent to the transmitter, though in some cases it is sent automatically, or in other cases, it is not sent at all. If the fantasy league data 690 is to be sent to the transmitter, it may pass through the "conversion to transmitter" operations 355 to convert from a into a transmitter type format before being sent to transmitter hardware controller 360.

FIG. 7 illustrates an exemplary fantasy football graphical user interface.

In particular, the fantasy football graphical user interface (GUI) 705 of FIG. 7 includes a pregame section 715 that includes information from the pregame period 110 (e.g., pre-game injury reports), as well as an in-game section 745 that includes information from the in-game period 120 (e.g., in-game trainer reports).

The pregame section 715 of FIG. 7 lists a number of sports players, and five columns of data about each of these sports players. The pregame section 715 includes a position column 720, where the position of each player is identified (e.g., quarterback or QB, tight end or TE, running back or RB, wide receiver or WR). The pregame section 715 includes a number column 725, where a number associated with each player is identified (e.g., a jersey number, a shirt number, a jacket number, a vehicle number, or a cap number). The pregame section 715 includes an owner column 730, where a sports team associated with each player is identified (e.g., the Patriots, the Broncos). The pregame section 715 includes an "injury report" column 735, where an injury-related playing status is identified (e.g., Active, Probable activity, Not playing). The pregame section 715 includes an injury column 740, where any known injuries of each player are identified (e.g., knee injury, hamstring injury, elbow injury, shoulder injury, unknown injury, or no injury/not applicable).

The in-game section 745 of FIG. 7 lists a number of sports players, and five columns of data about each of these sports players. The in-game section 745 includes a position column 750, where the position of each player is identified (e.g., quarterback or QB, tight end or TE, running back or RB, wide receiver or WR). The in-game section 745 includes a number column 755, where a number associated with each player is identified (e.g., a jersey number, a shirt number, a jacket number, a vehicle number, or a cap number). The in-game section 745 includes an owner column 760, where a sports team associated with each player is identified (e.g., the Patriots, the Broncos). The in-game section 745 includes an "replacement/back-up" column 765, where a number of a replacement or back-up player is identified that has replaced the identified player, or is planned to replace the identified player (e.g., in FIG. 7, player 17 is replaced with player 19, and player 7 is replaced with player 16, but players 11 and 31 are not replaced). The in-game section 745 includes an injury column 770, where injuries sustained or aggravated during the game period 120 (e.g., injuries causing replacement/back-up players to enter play) by each player are identified (e.g., knee injury, hamstring injury, elbow injury, shoulder injury, unknown injury, or no injury/not applicable).

While the fantasy league GUI of FIG. 7 is a fantasy football GUI 705, it should be understood that other sports may be represented in a fantasy league application 235 with a fantasy league GUI 680 for any sport, such as football (American and Global), baseball, basketball, soccer, ice hockey, lacrosse, rugby, cricket, tennis, track and field, golf, cycling, motor sports such as automobile or motorcycle racing, horse racing, Olympic games, and the like.

Figure 8:
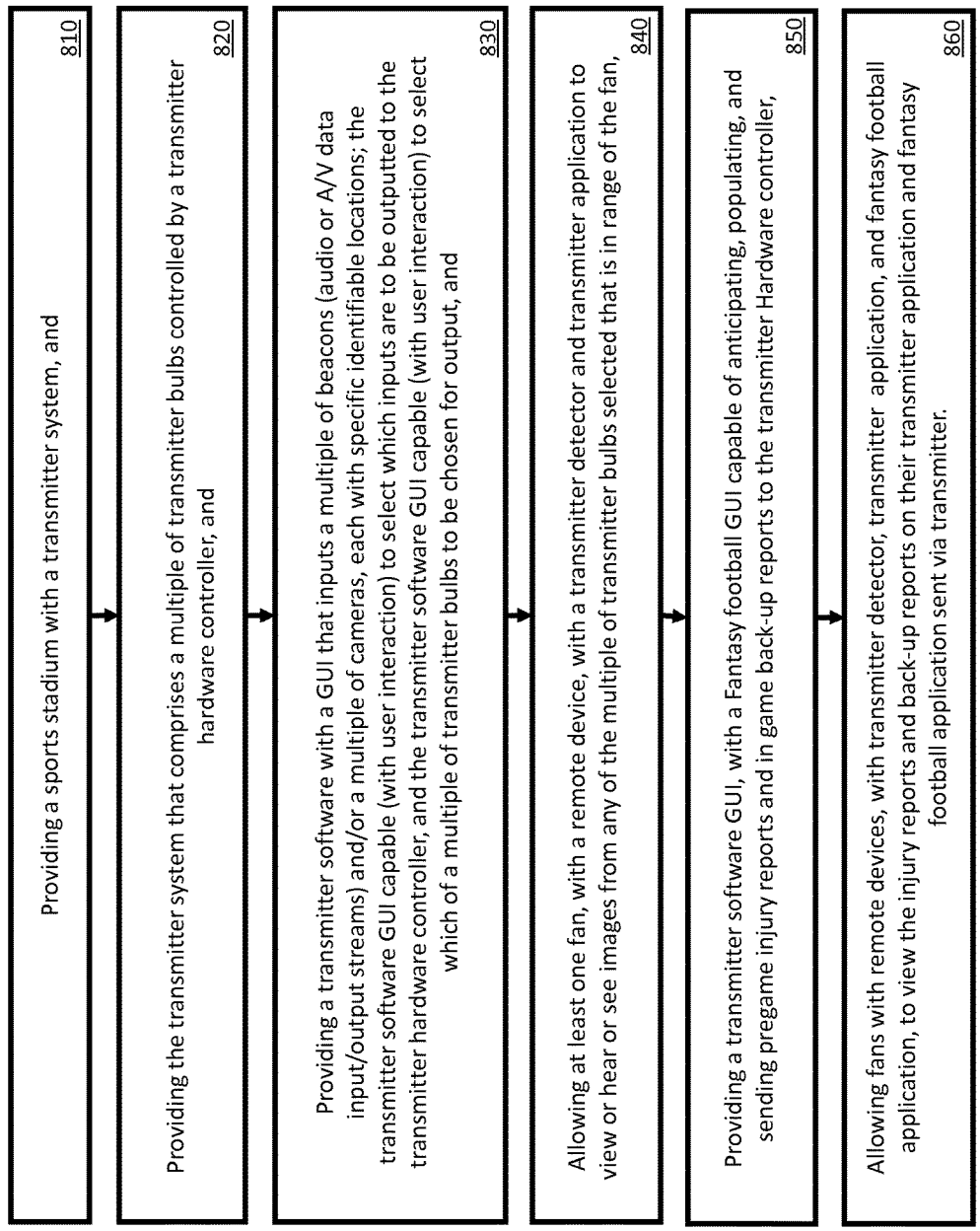
FIG. 8 illustrates an exemplary overall method of the present invention as described herein.

FIG. 8 illustrates an exemplary overall method of the present invention as described herein.

Step 810 of the overall method describes providing an event venue (e.g., a sports stadium) with a transmitter system 205.

Step 820 of the overall method describes providing the transmitter system 205 that comprises multiple transmitters 210 controlled by a transmitter hardware controller 360.

Step 830 of the overall method describes providing a transmitter software 380 with a GUI 350 that inputs multiple beacons 310 (audio or A/V data input/output streams) and/or multiple cameras 320, each with specific identifiable locations; the transmitter software GUI 350 capable (with user interaction) to select which inputs are to be outputted to the transmitter hardware controller 360, and the transmitter software GUI 350 capable (with user interaction or automatically) to select which of a plurality of transmitters 210 to be chosen for output.

Step 840 of the overall method describes allowing at least one eventgoer 240 (e.g. sport fan), with a remote device (e.g., mobile device 220), with a transmitter detector 225 and transmitter application 230 to view or hear or see images/video/audio from any of the plurality of transmitters 210 selected that is in range of the eventgoer/fan 240.

Step 850 of the overall method describes providing a transmitter software GUI 350, with a fantasy league GUI 680 (e.g., fantasy football GUI 705) capable of anticipating, populating, and sending pregame injury reports and in game back-up reports to the transmitter hardware controller 360.

Step 850 of the overall method describes allowing eventgoers/fans with mobile devices 200 (e.g., each with transmitter detector 225, transmitter application 230, and fantasy league application 235), to view the injury reports (e.g., injury report column 735 of FIG. 7) and back-up reports (e.g., backup report column 765 of FIG. 7) on their transmitter application 230 and/or fantasy league application 235 sent via one or more transmitters 210.

An eventgoer 240 may use his/her mobile device 220 to receive data from one or more transmitters to watch the event on his mobile device 220 from a specific camera angle.

FIG. 9 illustrates an exemplary computing system 900 that may be used to implement an embodiment of the present invention. The computing system 900 of FIG. 9 includes one or more processors 910 and memory 910. Main memory 910 stores, in part, instructions and data for execution by processor 910. Main memory 910 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 910 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 910.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A computer-implemented method, comprising:
retrieving, by a computing system, a selection dataset identifying a plurality of players of one or more teams scheduled to perform at an event at a specified time, the selection dataset previously selected by a user device;

retrieving, by the computing system from a remote server, injury data identifying an injury status of at least one player of the plurality of players;

receiving recorded visual data to the computing system, the recorded visual data recorded at least a predetermined period of time prior to the specified time by one or more visual media recording devices located at the event;

analyzing, by the computing system, the recorded visual data to determine validity of the injury status of the at least one player; and transmitting a notification indicating the validity of the injury status to the user device via one or more visible light communication (VLC) devices, wherein the user device is within transmission range of the one or more VLC devices.

2. The computer-implemented method of claim 1, further comprising:

converting the recorded visual data from a first format associated with at least a subset of the one more visual media recording devices to a second format associated with at least a subset of the one or more VLC devices.

3. The computer-implemented method of claim 1, further comprising:

receiving recorded audio data recorded by one or more audio media recording devices located at the event; and transmitting the recorded audio data to the user device via the one or more VLC devices.

4. The computer-implemented method of claim 1, wherein the recorded visual data includes a visual media file of a visual media file type of a plurality of visual media file types, the plurality of visual media file types including an image file type and a video file type.

5. The computer-implemented method of claim 1, further comprising:

receiving one or more recording device identifiers that identify the one or more visual media recording devices; and transmitting the one or more recording device identifiers to the user device via the one or more VLC devices.

6. The computer-implemented method of claim 1, further comprising:

receiving a transmitter selection input identifying the one or more VLC devices.

7. The computer-implemented method of claim 6, wherein the transmitter selection input is one of a user interface input from a user interface of the computing system or an automatic input that is generated by the computing system.

8. The computer-implemented method of claim 1, wherein the selection dataset is retrieved from a fantasy league interface accessible by the user device.

9. The computer-implemented method of claim 6, wherein the one or more VLC devices are selected based on proximity to a particular event occurrence.

10. The computer-implemented method of claim 1, wherein the injury status is one of a plurality of potential injury statuses that includes a no injury status, a knee injury status, a hamstring injury status, an elbow injury status, a shoulder injury status, or an unknown injury status.

11. A computing system, comprising:

one or more processors; and a memory device including instructions that, when executed by the one or more processors, cause the computing system to:

retrieve a selection dataset identifying a plurality of players of one or more teams performing at an event at a specified time, the selection dataset previously selected by a user device;

receive recorded visual data recorded at least a predetermined period of time prior to the specified time by one or more visual media recording devices located at the event;

retrieve, from a remote server, injury data identifying an injury status of at least one player of the plurality of players;

analyze the recorded visual data to determine validity of the injury status of the at least one player; and transmit a notification indicating the validity of the injury status to the user device via one or more VLC devices, wherein the user device is within transmission range of the one or more VLC devices.

12. The computing system of claim 11, wherein the instructions, when executed by the one or more processors, further cause the computing system to:

convert the recorded visual data from a first format associated with at least a subset of the one or more visual media recording devices to a second format associated with at least a subset of the one or more VLC devices.

13. The computing system of claim 11, wherein the instructions, when executed by the one or more processors, further cause the computing system to:

receive recorded audio data recorded by one or more audio media recordings device located at the event; and transmit the recorded audio data to the user device via the one or more VLC devices.

14. The computing system of claim 11, wherein the recorded visual data includes a visual media file of a visual media file type of a plurality of visual media file types, the plurality of visual media file types including an image file type and a video file type.

15. The computing system of claim 11, wherein the instructions, when executed by the one or more processors, further cause the computing system to:

receive one or more a recording device identifiers that identify the one or more visual media recording device; and transmit the one or more recording device identifiers to the user device via the one or more VLC devices.

16. The computing system of claim 11, wherein the instructions, when executed by the one or more processors, further cause the computing system to:

receive a transmitter selection input identifying the one or more VLC devices.

17. The computing system of claim 16 wherein the transmitter selection input is one of a user input interface of the computing system or an automatic input generated by the computing system.

18. The computing system of claim 16, wherein the one or more VLC devices are selected based on proximity to a particular event occurrence.

19. A non-transitory computer-readable storage medium, having embodied thereon a program executable by a processor to perform a method comprising:

retrieving, by a computing system a selection dataset identifying a plurality of players of one or more teams scheduled to perform at an event at a specified time, the selection dataset previously selected by a user device;

retrieving, by the computing system from a remote server, injury data identifying an injury status of at least one player of the plurality of players;

receiving recorded visual data to the computing system the recorded visual data recorded at least a predetermined period of time prior to the specified time by one or more visual media recording devices located at the event;

analyzing, by the computing system, the recorded visual data to determine validity of the injury status of the at least one player; and transmitting a notification indicating the validity of the injury status to the user device via one or more VLC devices, wherein the user device is within transmission range of the VLC devices.

20. The computing system of claim 11, wherein the selection dataset is retrieved from a fantasy league interface accessible by the user device.

* * * * *